July 27, 1965

N. O. KRENKE 3,197,257

FLUID CONVEYING SYSTEM

Filed July 17, 1962

2 Sheets-Sheet 1

INVENTOR.
Norman O. Krenke

BY
Learman, Learman & McCulloch
ATTORNEYS

INVENTOR.
Norman O. Krenke 3,197,257
FLUID CONVEYING SYSTEM
Norman O. Krenke, Saginaw, Mich., assignor to Baker Perkins Inc., Saginaw, Mich., a corporation of New York
Filed July 17, 1962, Ser. No. 210,392
18 Claims. (Cl. 302—3)

This invention relates to certain novel and useful improvements in fluid conveying systems and more particularly to positive and vacuum pneumatic conveying systems of the type wherein flour or another similar product is conveyed by an air stream from one destination to another.

One of the prime objects of the present invention is to provide a particulate material conveying system of the character described with means sensitive to the transmission of material through the line which automatically regulates the flow of material in a manner such that the conveyance of material remains constant or uniform in terms of volume until the supply of material in the bin is exhausted.

A corollary object of the invention is to utilize the relatively constant flow obtained to gauge the amount of material remaining in the storage bin.

Another object of the invention is to provide means measuring the outflow of material from the storage bin which is sensitive to the pressure in the material conveying conduit and does not operate unless material is being fed at a normal rate into the conveying fluid stream.

A further object of the invention is to provide a system of the type mentioned which is highly reliable in operation and accurately indicates to the baker or other user of the material the quantity of material remaining in his bin or bins at all times.

A further object of the invention is to provide a system of the character described, incorporating an air slide plenum chamber in the storage bin for moving material to the feeder discharging the material into the conveying conduit, which does not require a separate blower or the like for the plenum chamber.

Another object of the invention is to provide a system which is particularly suited to supplying flour to continuously operating dough processing equipment or which can be set to deliver predetermined quantities of material to various processing units.

A further object of the invention still is to provide a relatively simple and economical system of a type which will accomplish the foregoing and other functions and yet can be installed relatively economically in existing as well as newly manufactured pneumatic conveying systems.

Figure 5:
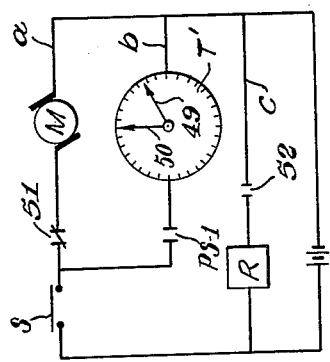
Figure 4:
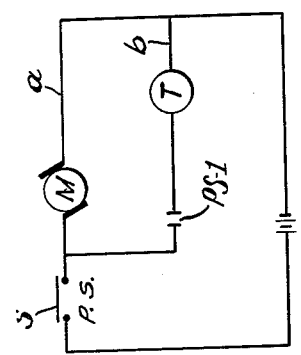
Figure 1:
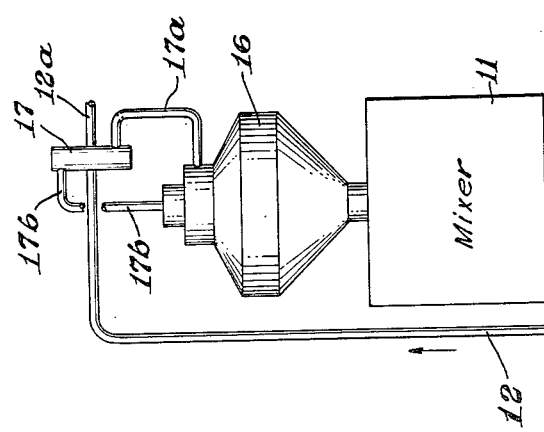
Figure 2:
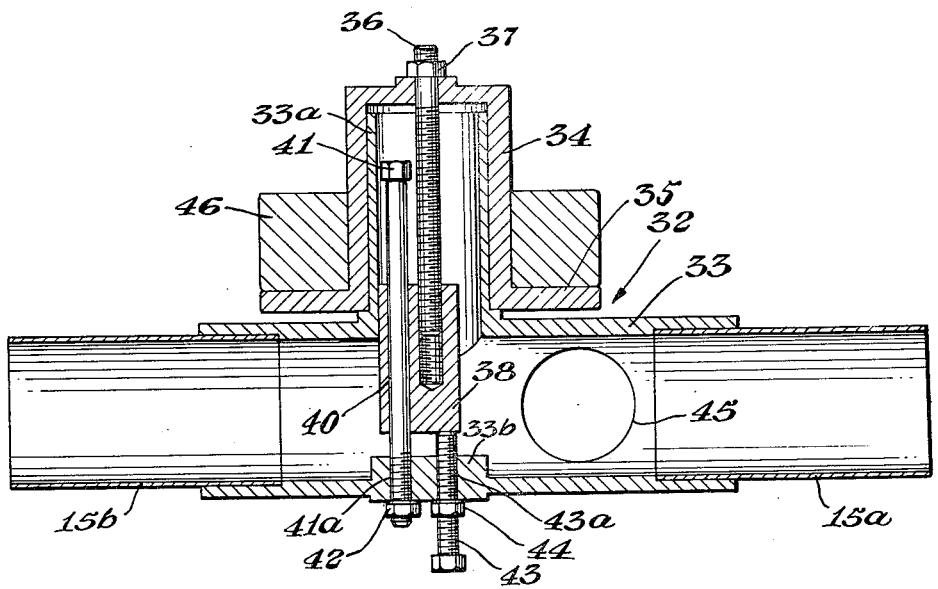
Figure 3:
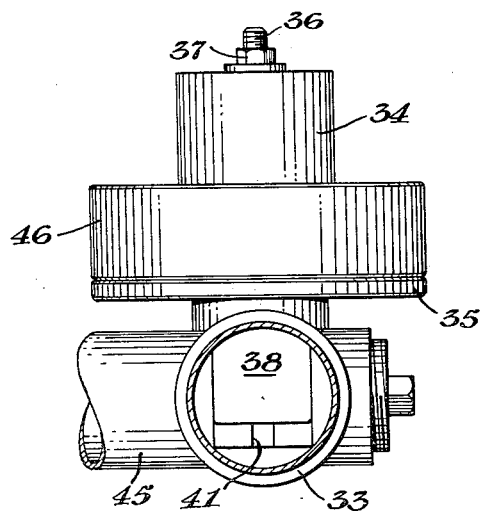

Other objects and advantages of the invention will be pointed out specifically or will become apparent from the following description when it is considered in conjunction with the appended claims and the accompanying drawings, in which:

FIGURE 1 is a schematic view illustrating a system in accordance with the invention;
FIGURE 2 is an enlarged, side elevational view of the resistance valve assembly which is employed;
FIGURE 3 is an end elevational view on a similar scale;
FIGURE 4 is a schematic view illustrating electrical control circuitry for the system; and
FIGURE 5 is a similar view illustrating slightly modified circuitry.

Referring now more particularly to the accompanying drawings, in which I have shown a preferred embodiment of the invention only, a numeral 10 in FIGURE 1 illustrates a storage bin or receptacle for storing flour which is to be intermittently conveyed to a dough mixer 11 through a conduit or line 12. Communicating with the bin 10 is a paddle wheel type feeder 13 including paddle wheel vanes 13a for feeding flour from the storage bin 10 into an air stream which is created by a suitable blower unit 14. Any suitable motor-driven feeder may be employed and one which is suitable for the purpose is disclosed in Colburn's United States Patent No. 2,550,781. Another is shown in Kennedy's United States Patent No. 2,585,472. The blower 14 may be a positive displacement compressor or blower of the Roots type, which is capable of delivering an air stream at a velocity of 4000 to 5000 feet per minute through the conduit 15 connecting the blower 14 and feeder 13.

The mixer 11 has a unit mounted on top thereof which includes a flour hopper 16 and a valve 17 of the type shown in FIGURES 2 and 3 of Krenke Patent No. 2,688,-518, the valve 17 either delivering flour to the mixer 11 or bypassing the mixer 11 so that the flour can be delivered through line 12a to another mixer or the like. The line 17a is the charge conduit referred to in the aforementioned Krenke patent and the line 17b is the discharge conduit from the valve 17.

Flour can be supplied to the storage bin 10 in any convenient manner. For example, a Roots blower 18 can be employed to supply an air stream to a dump hopper through a line 19 with the hopper having a feeder 20 of the same construction as feeder 13, which has an outlet line 21 leading to a flour sifter having another feeder 22 of the same construction. Line 21 leads to a separator 23 which separates flour from the air stream and permits it to proceed through a similar feeder 24 to the flour sifter, the air stream being fed by a line 25 to the feeder 22 so that it receives the flour once again after it has been processed through the sifter. The output line 26 from the sifter leads to a tube 27 supported within an outer tube 28, in the manner of Krenke et al. Patent No. 3,030,153, which constitutes a separator unit operating to separate the flour and charge it to the bin 10, the air, for practical purposes free of entrained flour, returning to blower 18 through a line 29.

Thus far, a conventional pneumatic conveying system has been described and bin 10 preferably is of the type having air slide plenum chambers 30 of the character shown, for example, in United States Patents Nos. 1,971,-852 and 2,694,496, wherein a suitable gas pervious canvas or other lining 31 separates the plenum chambers 30 from the flour in the remainder of the bin 10. The operation of these air slide chambers 30 is well known and will not be herein described in detail. Briefly, with an air pressure in plenum chambers 30 the upward movement of air through the inclined canvas or fabric 31 and into the flour causes the flour to fluidize and flow in a manner similar to water, with the various particles of flour maintained in a state of temporary suspension. In this manner the flour is fed to the feeder 13 at a rate which is dependent on the pressure of the air in plenum chambers 30. Usually, a separate blower is used to supply air under pressure to the plenum chambers in a bin but, as presently will be apparent, the system described herein eliminates the need for employing such a blower.

Mounted in the conduit 15, between the blower 14 and feeder 13, is a resistance valve assembly generally designated 32 which comprises an inversely disposed, T-shaped section or housing 33 into which the pipe sections 15a and 15b of the conduit 15 are secured as shown. Closely fitting over the upper portion 33a of the section 33, but vertically movable thereon, is a cap section 34 having a laterally extending flange 35, as shown. The member 34 mounts a dependent, threaded stud 36 which can be secured by a nut 37, and mounted on the lower end of stud 36 is a valve plate or block 38 having a threaded bore 39 which threads on the stud 36. Also provided in the valve 38 is a bore 40 adapted to receive a guide rod 41 which can be threaded into the base 33b of the housing 33 as at 41a and secured by a nut 42, the rod 41 insuring true vertical movement of the valve 38. A stop bolt 43 to limit the downward movement of valve 38 can also be threaded into the base portion 33b of housing 33 as at 43a, and a nut 44 can be used to secure it in adjusted position.

Provided leading into the valve assembly 32 upstream of the valve plate 38 is a pipe 45 extending to one of the plenum chambers 30, a branch pipe 45a leading around to the other plenum chamber 30. The flange 35 is used to support a weight ring 46 which biases the valve 38 toward the "down" position in which it is shown in FIGURE 2, the weight 46 being chosen to lower valve 38 and create the desired resistance to air flow through the housing 33, dependent on the back pressure in pipe section 15a upstream of the feeder and accordingly dependent on the volume of material fed into the system by the feeder 13. With pipes 45 and 45a connecting to the air slide plenum chambers 30, the flow of flour is controlled by resistance valve assembly 32.

In FIGURE 4 I have shown typical electrical control circuitry which may be employed in operating the system described. The motor M for revolving the shaft 13b of feeder 13 is mounted in a circuit line a with motor starter switch S, and the contacts PS-1 of a pressure switch PS and motor of timer T are mounted in a parallel circuit line b, as shown. The pressure switch PS connects into the conduit 15 upstream of feeder 13 by means of a line or conduit pipe 48. The timer T may be a conventional timer calibrated in minutes with the time on the meter representing the amount of material taken from an initially full bin. The inventory of the bin will thus be known at any time. The pressure control switch PS is constructed so that its contacts PS-1 are open and the timer does not run if the pressure is over or less than a predetermined pressure.

To obtain the discharge rate figure in the first place, the bin is loaded with a known quantity of material and the clock or timer reading is returned to zero. Thence, during a trial run in which the bin is emptied of material, the time elapsed and the operating pressure is observed. Under these conditions the discharge from the bin in pounds per minute is known and also the desirable operating pressure is known and pressure control limits can bet set. Usually, the pressure control switch PS is set so that the contacts PS-1 are open if the pressure in line 48 is more than one p.s.i. over or less than the constant conveying pressure reading determined in the trial run. The constant conveying pressure may be about .25-20 p.s.i. or greater, dependent on the length and diameter of the line. A suitable timer which may be used is the General Electric Model 8K7 timer, which is calibrated in minutes. A suitable pressure switch is the Mercoid pressure control Model DA-31, which is of a type which includes a Bourdon tube power element and has outside adjustments for the individual setting of both high and low operating points. The pressure switch or control includes a tilting type sealed mercury contact.

In operation, in order to keep the feed through feeder 13 constant, the valve 38 is raised or lowered to restrict the supply of air passing through the line 15, the valve 38 rising as the pressure rises. The weight 46 is gauged so that valve 38 lifts it out of conduit restricting position at a predetermined desired minimum operating pressure. Thus, if the pressure is below minimum the restrictive valve 38 descends to "down" position, restricting the line 15 and tending to increase the pressure in line 45 leading to the air slide in bin 10 so that the greater pressure in the plenum chambers 30 tends to enhance the flow of flour to the feeder 13. While I have shown air slide plenum chambers in the bin 10, it should be understood that the line 45 could lead to conventional air pads or air jet openings which blow air directly into the flour, both mechanisms increasing the flow of flour from the bin with an increase in the air pressure delivered by pipe 45.

When the bin 10 is empty or the material in the bin is bridged so that there is no discharge of material to the feeder 13, there is substantially no back pressure in conduit 15 since no material is being fed into the conveying line 12. At this time the pressure in line 15, and accordingly in line 48, will be minimum and, in fact, below the pressure preset for the pressure switch PS. Thus, the timer T will not be operated and the operator will be warned that some action on his part is necessary to insure proper operation of the system. It may be that the moisture content of the flour is higher than expected, or the filter sacks are dirty, or foreign material has lodged in the feeder, or the motor drive chain has broken, or that the system is inoperative for some other reason. Once the problem is solved, or the bin is refilled with a supply of flour via line 26, a back pressure in line 15 is created by the flour transmitted by feeder 13 into the fluid stream in pipe 12 at a constant rate and the pressure in line 48 will be such that the timer commences to operate. In a situation in which the line 12 upstream of feeder 13 is plugged an over pressure will be transmitted to switch PS and contacts PS-1 will similarly be opened until the condition is corrected.

If the bin 10 in the system illustrated in FIGURES 1-4 has been refilled and the timer T set at zero, the operator need only watch the meter or timer T to know when the desired amount of flour has been fed into line 12 for delivery to mixer 11. Otherwise, he must note the beginning time on timer T and then stop the motor M of feeder 13 at a time when the desired amount of flour has been delivered through feeder 13.

While a mixer supplying "use" bin has been shown in the system illustrated, it should be quite clear that the resistance valve unit 32 and pressure switch PS and timer T could be employed upstream of feeders emptying a bulk bin or bulk car, or a plurality thereof. Also, in place of the timer T, a motor driven, clock-type timer T' (see FIGURE 5) of conventional construction including a hand 49 moving in increments around the clock face with each minute and a hand 50 which could be set at any place on the dial could be employed. Normally open contacts 52 mounted on both hands 49 and 50 would be made when the time-keeping hand 49 arrived at a location where the manually set hand was set to turn off the motor M of the feeder 13 automatically to energize a relay R which opens normally closed contacts 51. With this apparatus the operator could set the feeder 13 to deliver a predetermined quantity of flour.

It should be apparent that I have perfected an improved pneumatic conveying system which differs from conventional conveying systems in important respects. It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a fluid conveying system; fluid stream introducing means including conduit means for transmitting particulate material entrained in the fluid stream; receptacle means for said particulate material connecting into said conduit means; an element, sensitive to the pressure in said conduit means, disposed in said conduit means upstream of said receptacle means and biased to interpose a resistance to flow in said conduit means when the pressure condition of the flow through said conduit means lowers; and means communicating with said conduit means upstream of said resistance interposing means aiding the discharge of material from said receptacle means in accordance with the pressure condition in said conduit means.

2. In a fluid conveying system; fluid stream introducing means including conduit means for transmitting particulate material entrained in the fluid stream; storage means for said particulate material; feeder means for said storage means connecting into said conduit means; an element, sensitive to the pressure in said conduit means, disposed in said conduit means upstream of said feeder means and biased to interpose a resistance to flow when the pressure of the flow through said conduit means lowers; and pipe means connecting with said conduit means upstream from said resistance interposing means communicating with said storage means and introducing the pressure of said conduit means upstream of said feeder means to said storage means.

3. The combination defined in claim 2 in which air slide plenum means is provided in said storage means for discharging said material to said feeder means; and said pipe means connects into said plenum means.

4. The combination defined in claim 3 in which said storage means comprises a bin and said feeder means comprises a rotary paddle wheel feed member at the lower end thereof open to the top of said air slide plenum means.

5. In a fluid conveying system; fluid stream introducing means including conduit means for transmitting particulate material entrained in the fluid stream; storage means for said particulate material; motor driven feeder means for said storage means connecting into said conduit means; means upstream of said feeder means interposing a resistance to flow dependent on the pressure of the flow through said conduit means; pipe means connected with said conduit means upstream of said resistance interposing means communicating with said storage means and introducing the varied pressure of said conduit means to the material in said storage means to stabilize the flow therefrom; and means connected to operate when said motor driven feeder means operates and sensitive to the pressure in said conduit means indicating the extent of operation of said motor driven feeder means when said pressure in the conduit means is within prescribed limits.

6. The combination defined in claim 5 in which air slide plenum means is provided in said storage means for discharging said material to said feeder means; and said pipe means connects into said plenum means.

7. The combination defined in claim 5 in which said latter means comprises an electrically operated timer electrically connected in parallel with the motor of said feeder means and a pressure operated, electrical switch connected with said conduit means which is energized only when the pressure within said conduit means is within said limits.

8. The combination defined in claim 7 in which said timer includes contact means connected in circuit with said feeder means motor settable to stop said feeder means motor when said timer has run a predetermined length of time.

9. In a fluid conveying system; conduit means; fluid stream introducing means communicating therewith; storage means for particulate material to be entrained in and conveyed by said fluid stream; motor driven feeder means for delivering said material from the storage means to the conduit means; indicating means connected to operate with said feeder means and indicate the extent of operation of said feeder means; and means, connected to operate when said motor driven feeder means operates and sensitive to the pressure in said conduit means, upstream of said feeder means for operating said indicating means only when said pressure falls within predetermined limits.

10. The combination defined in claim 9 in which said indicating means comprises an electrically operated timer electrically connected in parallel with the motor of said feeder means and said means sensitive to the pressure in said conduit comprises a pressure operated electrical switch which is energized only when the pressure within said conduit is within said limits.

11. The combination defined in claim 10 in which said timer includes contact means connected in circuit with said feeder means motor settable to stop said feeder means motor when said timer has run a predetermined length of time.

12. In a fluid conveying system; fluid stream introducing means including conduit means for transmitting particulate material entrained in the fluid stream; storage means for said particulate material; feeder means for said storage means connecting into said conduit means; means upstream of said feeder means interposing a resistance to flow dependent on the pressure of the flow through said conduit means; pipe means connecting with said conduit means upstream from said resistance means interposing means communicating with said storage means and introducing the pressure of said conduit means upstream of said feeder means to said storage means; said resistance interposing means comprising a valve movable from a first position substantially not restricting said conduit to a position partially restricting said conduit; and means for biasing said valve toward said latter position.

13. In a fluid conveying system; fluid stream introducing means including conduit means for transmitting particulate material entrained in the fluid stream; storage means for said particulate material; feeder means for said storage means connecting into said conduit means; means upstream of said feeder means interposing a resistance to flow dependent on the pressure of the flow through said conduit means; pipe means connecting with said conduit means upstream from said resistance interposing means communicating with said storage means and introducing the pressure of said conduit means upstream of said feeder means to said storage means; said resistance interposing means comprising a valve movable from a first position substantially not restricting said conduit to a position partially restricting said conduit; means for biasing said valve toward said latter position; said conduit means including an offset portion to at least partially house said valve when it is in said first position; and a vertically reciprocable guide extending through said offset portion and mounting said valve; said biasing means comprising weight means on said guide externally of said conduit means.

14. In a fluid conveying system; fluid stream introducing means including conduit means for transmitting particulate material; feeder means for said storage means connecting into said conduit means; means upstream of said feeder means interposing a resistance to flow dependent on the pressure of the flow through said conduit means; and pipe means connecting with said conduit means upstream from said resistance interposing means communicating with said storage means and introducing the pressure of said conduit means upstream of said feeder means to said storage means; said fluid stream introducing means and feeder means charging material to the conduit means normally maintaining a predetermined minimum operating pressure therein and said resistance interposing means comprising a valve element, sensitive to the pressure in said conduit means, biased to move from a first position substantially not restricting said conduit means to a position restricting said conduit means.

15. In a fluid conveying system; fluid stream introducing means including conduit means for transmitting particulate material entrained in the fluid stream; receptacle means for said particulate material connecting into said conduit means; an element, sensitive to the pressure in said conduit means and disposed in said conduit means upstream of said receptacle means, biased to move inwardly relatively to said conduit means when the pressure condition in said conduit means falls to resist flow through the conduit means and automatically moved outwardly under the force of the pressure condition existing when the pressure condition in said conduit means rises.

16. In a fluid conveying system; fluid stream introducing means including conduit means for transmitting particulate material entrained in the fluid stream; storage means for said particulate material; motor driven feeder means for said storage means connecting into said conduit means; means upstream of said feeder means interposing a resistance to flow dependent on the pressure of the flow through said conduit means; pipe means connected with said conduit means upstream of said resistance interposing means communicating with said storage means and introducing the varied pressure of said conduit means to the material in said storage means to stabilize the flow therefrom; and indicating means connected to operate only when said motor driven feeder means operates and sensitive to the pressure in said conduit means providing an indication of the amount of material delivered by said motor driven feeder means.

17. In a fluid conveying system; conduit means; fluid stream introducing means communicating therewith; supply means for particulate material to be entrained in and conveyed by said fluid stream; motor driven feeder means for delivering said material from the supply means to the conduit means; indicating means; and means sensitive to the pressure existing in said conduit means for operating said indicating means when the feeder means is operating and a predetermined pressure exists in said conduit means to indicate the quantity of material delivered through said conduit means.

18. In a fluid conveying system; conduit means; fluid stream introducing means communicating therewith; supply means for particulate material to be entrained in and conveyed by said fluid stream; means for delivering said material from the supply means to the conduit means; indicating means; and means sensitive to the pressure existing in said conduit means for operating said indicating means in accordance with the pressure existing in said conduit means to indicate the quantity of material delivered through said conduit means.

References Cited by the Examiner

UNITED STATES PATENTS

| 2,636,642 | 4/53 | Gorin | 302—53 |
| 2,681,748 | 6/54 | Weller | 302—54 |
| 2,683,518 | 9/54 | Krenke | 302—28 |
| 2,694,496 | 11/54 | Atkinson | 302—52 |
| 2,726,122 | 12/55 | Hagerbaumer | 302—53 |
| 2,774,637 | 12/56 | Sylvest | 302—29 |
| 2,826,459 | 3/58 | Oetiker | 302—35 |
| 2,827,333 | 3/58 | Wallin | 302—36 |
| 2,919,159 | 12/59 | Lacroix | 302—53 |
| 2,938,751 | 5/60 | Nogami | 302—36 |
| 3,001,829 | 9/61 | De Saint-Martin | 302—53 |

SAMUEL F. COLEMAN, *Primary Examiner.*

ANDRES H. NEILSEN, WILLIAM B. LA BORDE,
*Examiners.*